2,850,428

PARTIALLY DEPOLYMERIZED HYALURONIC ACID AS A SPREADING AND LIPEMIA-CLEARING AGENT

Joseph Seifter and David Harry Baeder, Philadelphia, Pa., assignors to American Home Products Corporation, New York, N. Y., a corporation of Delaware No Drawing. Application August 18, 1954
Serial No. 450,779

9 Claims. (Cl. 167—74)

This invention relates to the preparation and use of partially depolymerized hyaluronic acid as a spreading and lipemia-clearing agent.

In the injection of the therapeutic agents, prompt spreading of the agents in the tissues is frequently desirable. This is particularly so in the case of local and regional anesthetics and in hypodermoclysis. Recently the enzyme hyaluronidase has been successfully used as a spreading agent both on animals and clinically on human beings. This action is usually attributed to the decrease in viscosity of the ground substance which results from depolymerization of the hyaluronate by the enzyme. The effect is to decrease the normal resistance of the barrier. Another possibility is that the enzyme releases partially depolymerized hyaluronic acid (referred to below as PDHA) which then acts as a transport agent, ion-exchanger, or a protective colloid and peptizing agent, aiding the dispersion of materials in the tissues.

In experiments to determine this point, we have discovered that partially depolymerized hyaluronic acid (PDHA) facilitates the spread and absorption of injected materials in animal and human tissues, that this effect is a function of the degree of depolymerization, and that it can be employed in drug injections in living tissues.

While hyaluronidase is an effective spreading agent and has been successfully used therapeutically, it has several disadvantages not shared by PDHA. Hyaluronidase is a protein and tends to be unstable in aqueous solution. As a protein it is capable of producing sensitivity reactions and of neutralizing antibodies in the blood, so there is a possibility that prolonged use in the same patient may result in the negation of its usual properties. PDHA is non-antigenic and more stable in solution.

According to our invention we partially depolymerize hyaluronic acid (designated as HA) by incubating it in the form of an alkali metal salt in aqueous solution with hyaluronidase under controlled time and temperature conditions, and then deactivate and remove the enzyme. The resulting solution of PDHA is mixed with the material to be injected and the mixture injected.

A suitable degree of depolymerization of HA is reached by incubating, for example, 5 percent sodium hyaluronate in physiological salt solution with a small amount of hyaluronidase at about 38° C. for 15 minutes, after which the enzyme is deactivated and removed by autoclaving and certifuging. The supernatant contains the desired PDHA.

Longer incubation reduces the spreading effects; for example, incubation for 60 minutes lessens it by at least 50 percent. The degree of depolymerization for our purpose should correspond to that obtained by incubation under the described conditions for a period of at least 5 minutes and less than 60 minutes. The depolymerization may be effected otherwise than by hyaluronidase, as by non-enzymatic procedures involving, for example, treatment with ascorbic acid or with hydrogen peroxide and a metal, especially copper.

In addition to its spreading action, PDHA has been found to have a lipemia-clearing action when administered intravenously, subcutaneously or orally.

In view of the high statistical correlation between hyperlipemia and subsequent serious circulatory, cardiac and other diseases, an effective means of correcting hyperlipemia has been sought for. "A Textbook of Medicine," edited by R. L. Cecil and R. F. Loeb, 8th ed. (1951), under the heading "Increase in Blood Lipids and Cholesterol," states, "It is probable that these high cholesterol values have a causal relationship to the atherosclerosis commonly found in nephrotic persons coming to autopsy after the disease has been present for a prolonged period of time." In "Experimental Atherosclerosis" by Katz and Stamler (Charles C. Thomas, 1953), the authors point out that, in a sample of 201 persons, "The high incidence of coronary atherosclerosis in these hypercholesterolemic persons is evident," and that, "Further, analysis of the patients with coronary artery disease reveals that 86% of them had hypercholesterolemia (plasma cholesterol greater than 300 mg. %)." (Page 58.) With respect to corrective therapy, they report, "Efforts to lower the plasma cholesterol level by the administration of lipotropic factors have met with indifferent results." (Page 56.) In Northwest Medicine, vol. 51, pp. 860 ff. (October 1952), A. N. Nelson, M. D., discusses methods of controlling serum cholesterol levels "directed toward lessening of the clinical hazard of cardiovascular accident." He discusses the difficulties of rigid diet control and adds, "Medication with choline and inositol only is considered of questionable value for treatment of atherosclerosis. Unless lipotropic agents are used in conjunction with a cholesterol-restricted diet blood cholesterol levels remain unchanged. If the fat in the diet is increased beyond 2 tablespoonfuls daily, much of the lipotropic effect is lost. Morrison [9] has reported benefits from lipotropic medication in young individuals suffering from myocardial infarction, and claims that in patients treated with 6 gm. choline daily the mortality rate is reduced.[9] However, long-continued use of choline in such large doses is impractical because of the expense, and undesirable because of the attendant offensive body odor, of which the patient is unaware.

"* * * The purpose in treatment, then, was to lower the abnormally elevated plasma cholesterol level and raise the phospholipid fraction, achieving both simultaneously,[10] and thus to forestall, if possible, further coronary occlusion or cerebral accident."

In a case of essential family hyperlipemia, attempts made to reduce the blood fat by various lipotropic agents met with little success, but combination of choline with a reduced fat intake produce some improvement. (Chem. Abs. 33 (1939), 723,[8] from Acta Paediat. 22 (1937), 425–6.)

It is clear that an effort to lower the blood lipid level when hyperlipemia was diagnosed in a patient was common; regardless of a proved connection between hyperlipemia and atherosclerosis, it became usual medical practice to attempt such reduction in hyperlipemic patients.

The lipemia-clearing action of PDHA thus finds a useful place in hyperlipemia therapy.

Examples of the preparation of physiological effects of partially depolymerized hyaluronic acid according to our invention are given below, but these are intended to be illustrative only and not to limit our invention, the scope of which is defined in the appended claims.

EXAMPLE 1

Preparation of PDHA

A 5% solution of sodium hyaluronate (HA) was prepared by dissolving 1250 mg. of streptococcal HA in 25 ml. of physiological salt solution U. S. P. The mixture was placed in a water bath at 38°±1° C. and stirred until the hyaluronate was in solution. To the HA solution 25 mg. of hyaluronidase (1000 TRU/mg.) was added and stirred until is dissolved. The HA-hyaluronidase mixture was kept in the water bath for 15 minutes after which it was removed and placed in a steam pressure autoclave for 40 minutes (T.=104° C.). At the end of 40 minutes the pressure in the autoclave was permitted to return to normal by shutting off the steam supply. The precipitated hyaluronidase was removed by centrifugation at 1800 R. P. M. (10 cm. radius) for 15 minutes. The supernatant fluid, containing the partially depolymerized hyaluronic acid as its sodium salt (PDHA), was assayed by the turbidimetric assay for residual hyaluronidase. The assay showed less than 0.1 TRU hyaluronidase/ml. of solution. This solution containing the depolymerized HA has pronounced spreading action and facilitates absorption of solutions injected subcutaneously. If the depolymerization by the enzyme is prolonged to 60 minutes the spreading action is lessened by at least 50%.

The effect of duration of incubation on the spreading activity of PDHA is shown in the following table. The PDHA was prepared as above except that the incubation period was varied. Doses of 5 mg. in 0.1 ml. test solution and 0.1 ml. 1% trypan blue in physiological salt solution were injected intradermally into anesthetized rats, and the area of spread was determined after a lapse of 60 minutes as described in Example 2. The results are given in the following table in comparison with control injections of physiololgical salt solution (PSS) and of 1000 TRU of hyaluronidase. It will be seen that in this series the spreading effectiveness of PDHA increases with incubation time from 5 minutes to 20 minutes, falls to a plateau at 30–50 minutes, and starts decreasing again at 55 minutes. Effective spreading is obtained in the range from 5 minutes to not over 60 minutes, but maximum effectiveness is obtained in the preferred range 10–25 minutes.

TABLE I.—RELATION OF INCUBATION TIME OF HYALURONIC ACID WITH HYALURONIDASE TO SPREADING EFFECTIVENESS OF PARTIALLY DEPOLYMERIZED HYALURONIC ACID (PDHA)

| Composition injected | Area of spread (sq. mm.) after 60 min. |
|---|---|
| Physiological salt solution (PSS) | 255.0 |
| Hyaluronidase, 1000 TRU | 596.2 |
| PDHA incubated 5 minutes | 462.6 |
| PDHA incubated 10 minutes | 565.0 |
| PDHA incubated 15 minutes | 981.4 |
| PDHA incubated 20 minutes | 1,047.4 |
| PDHA incubated 25 minutes | 883.3 |
| PDHA incubated 30 minutes | 483.4 |
| PDHA incubated 35 minutes | 447.2 |
| PDHA incubated 40 minutes | 441.9 |
| PDHA incubated 45 minutes | 433.5 |
| PDHA incubated 50 minutes | 417.4 |
| PDHA incubated 55 minutes | 399.9 |

EXAMPLE 2

Comparison of the spreading action of PDHA with that of hyaluronidase

Spreading tests were made on albino rabbits of both sexes weighing between 2.3 kg. and 2.9 kg. The intradermal injections were made through a 26 gauge, one-half inch needle into the lumbar and scapular regions clipped free from hair. The injections consisted of 0.1 ml. of 1% trypan blue in physiological salt solution (PSS) mixed with 0.1 ml. of test solution. Measurements of the large diameter of spread (D) and the small diameter of spread (d) were made with a vernier caliper immediately after injection and 15, 30, and 60 minutes later. The area of spread was computed from the formula for the area of an ellipse, $$A_{sq.\ mm.} = \frac{D \times d \times \pi}{4}$$

Each concentration of a substance was tested on a minimum of 6 rabbits. Each rabbit received a control injection of PSS. The injection sites for the control and materials to be tested were randomized.

In the following table a comparison is made of the spreading effect of increasing doses of hyaluronidase and of 5 mg. streptococcal PDHA hydrolyzed 15 minutes and hydrolyzed 60 minutes.

TABLE II.—SPREADING EFFECT OF HYALURONIDASE AND STREPTOCOCCAL PDHA IN RABBITS INJECTED WITH 1% TRYPAN BLUE

| Dosage | Control (PSS) | Hyaluronidase—TRU [1] injected | | | | | |
|---|---|---|---|---|---|---|---|
| | | 100 | 1,000 | 2,000 | 5,000 | 10,000 | 20,000 |
| Mean area of spread, mm.² | 153.5 | 197.2 | 388.2 | 483.0 | 643.6 | 675.6 | 587.2 |

| | PDHA injected—hydrolyzed for— | |
|---|---|---|
| | 15 min. | 60 min. |
| Dosage mg. | 5 | 5 |
| Mean area of spread, mm.² | 553.1 | 241.3 |

[1] TRU=turbidity reducing units.

It is seen that 5 mg. 15-minute PDHA has a greater effect than 2000 TRU and less than 5000 TRU of hyaluronidase. The 60-minute PDHA had somewhat less than half this effect.

EXAMPLE 3

Undepolymerized hyaluronic acid (HA) had practically no useful spreading effect, as compared with the control of Table II. The results of tests on rabbits with HA from different sources and in different amounts is shown in Table III.

TABLE III.—SPREADING EFFECT OF HA ON RABBITS INJECTED WITH 1% TRYPAN BLUE—MM.² IN 60 MINUTES

| Amount injected, μg. | Control | 50 | 100 | 1,000 | 2,000 | 5,000 |
|---|---|---|---|---|---|---|
| PSS | 153.5 | | | | | |
| Streptococcal HA | | 147.1 | 217.2 | 198.1 | 163.7 | 100.3 |
| Umbilical cord HA | | 160.7 | 193.5 | 202.2 | 149.5 | 112.9 |
| Vitreous humor HA | | 202.2 | 194.7 | 171.5 | 142.3 | 138.3 |

EXAMPLE 4

Hypodermoclysis

The ability of PDHA to facilitate a hypodermoclysis of PSS in rabbits is shown in Table IV. It will be seen that 150 mg. of PDHA was as effective as 150 TRU of the enzyme. In other experiments 50 and 100 mg. of PDHA added to the clysis was without facilitating effect.

TABLE IV.—EFFECT OF HYALURONIDASE AND PDHA ON HYPODERMOCLYSIS IN RABBITS

| | Time for hypodermoclysis, minutes |
|---|---|
| Saline | 47 |
| Hyaluronidase, 150 TRU | 19 |
| Saline | 51 |
| PDHA, 150 mg. | 18 |

EXAMPLE 5

*Spread of an X-ray contrast medium*

Facilitation of spread and absorption of an X-ray contrast medium in guinea pigs is shown in Table V. It can be seen that 150 TRU of hyaluronidase or 150 mg. of PDHA increased the area of spread and the rate of absorption and appearance of the opaque material in the urinary bladder by twofold.

TABLE V.—EFFECT OF HYALURONIDASE AND PDHA ON ABSORPTION AND EXCRETION OF UROKON [1]

| Treatment group | Spread, mm.[2], at time of injection | Appearance in urinary bladder (minutes) |
| --- | --- | --- |
| Saline + Urokon | Mean 4.4 | 30 |
| 150 TRU hyaluronidase + Urokon | Mean 10.4 | 16.3 |
| 150 mg. PDHA + Urokon | Mean 11.4 | 16.9 |

[1] An X-ray contrast medium.

EXAMPLE 6

The effect of PDHA on an injected local anesthetic was tested on four human subjects. Threshold amounts of a proprietary local anesthetic "Wycaine" (a substituted glycinamide-ethanolamine derivative) were injected into the subjects both with and without the addition of PDHA. Since only threshold amounts were used, it was impossible to measure the spreading effect directly because increased spreading would result in subthreshold concentrations at the periphery. However, the duration of anesthesia offered an indirect measure of spreading, absorption being inversely proportional to the extent of spreading and rate of absorption. From the following table it will be seen that PDHA facilitates the spread and absorption of the injected anesthetic, the duration of anesthesia being substantially halved by its presence.

TABLE VI.—DURATION IN MINUTES OF LOCAL ANESTHESIA IN HUMAN SUBJECTS INJECTED WITH 1 ML. OF 0.02% "WYCAINE" WITH AND WITHOUT THE ADDITION OF 1 MG. PDHA

| Subject | Without PDHA | With PDHA |
| --- | --- | --- |
| 1 | 140 | 70 |
| 2 | >125 | 55 |
| 3 | >125 | 70 |
| 4 | 100 | 70 |

EXAMPLE 7

This example illustrates the lipemia-clearing effect of PDHA on dogs. Lipemia was established for the intravenous test in 3 male and 3 female fasted dogs by the intragastric administration of 20–25 ml./kg. of cottonseed oil. The extent of lipemia in the plasma was determined by determining its light transmission at 650 m$\mu$ in a Beckman quartz spectrophotometer using silica microcuvettes at 22° C. Lipemic plasma transmitted 35% or less of the incident light, while normal plasma transmitted 85% or more. The lipemia-clearing effect of intravenously administered PDHA is shown in Table VII.

In the table the first column indicates the dosage, the second column transmission of the plasma before treatment, the third column transmission 60 minutes after administration of cottonseed oil, and succeeding columns transmission after the number of minutes indicated in the headings. The PDHA was injected at the 60 minute interval.

TABLE VII.—LIPEMIA-CLEARING EFFECT OF INTRAVENOUS PDHA ON DOGS; PERCENTAGE LIGHT TRANSMISSION OF PLASMA (AVERAGE OF 6 DOGS) AT THE INDICATED TIME IN MINUTES AFTER ADMINISTRATION OF COTTON SEED OIL—PDHA INJECTED AT 60 MINUTES

| Dosage | Untreated | 60 min. | 90 min. | 120 min. | 150 min. | 180 min. | 210 min. | 240 min. | 300 min. | 360 min. |
| --- | --- | --- | --- | --- | --- | --- | --- | --- | --- | --- |
| 20 mg./kg. | 70 | 55 | 77 | 85 |  | 88 |  | 59 | 46 | 37 |
| 10 mg./kg. | 94 | 55 | 92 | 92 | 84 | 64 |  | 52 | 41 | 8 |

The oral effect of PDHA is shown in Table VIII. In this case no cottonseed oil was administered, but the plasma taken from dosed dogs at hourly intervals was added to lipemic plasma in the ratio of 0.1 ml.:0.5 ml., the mixture held for 5 minutes at room temperature (22° C.) and light transmission determined as above.

TABLE VIII.—LIPEMIA-CLEARING EFFECT OF ORAL PDHA ON DOGS; PERCENTAGE OF LIGHT TRANSMISSION OF PLASMA AT THE INDICATED TIME IN MINUTES AFTER START

| Dosage | Untreated | 60 min. | 120 min. | 180 min. | 240 min. | 300 min. |
| --- | --- | --- | --- | --- | --- | --- |
| 50 mg./kg. | 86 | 66 | 87 | 95 | 64 | 37 |

From the preceding disclosure it will be seen that we have discovered a new product useful in various ways in animal experimentation and in animal and human therapy, and a method of preparing it. It will be clear to those skilled in the art that various changes may be made without departing from the spirit of our invention.

The terms hyaluronic acid (HA) and partially depolymerized hyaluronic acid (PDHA) are used in the specification and claims to include both the free acids and their alkali metal salts. They also include hyaluronic acid and partially depolymerized hyaluronic acid regardless of the source of preparation, viz.: umbilical cord, vitreous humor or bacteria.

We claim:

1. The method of treating hyaluronic acid which essentially comprises: preparing a 5 percent solution of a hyaluronate in physiological salt solution, adding hyaluronidase in a ratio of 20 TRU per milligram of hyaluronate, incubating the mixture at 38° C., terminating the hyaluronidase action after a period in the range of 5 to less than about 60 minutes by heating the mixture to a hyaluronidase-reactivating temperature, thereby simultaneously precipitating the deactivated hyaluronidase, and separating the latter from the solution, whereby a solution is obtained of partially depolymerized hyaluronic acid in physiological salt solution free of hyaluronidase.

2. The method defined in claim 1 in which the incubation period is in the range 10–25 minutes.

3. A solution in physiological saline of hyaluronic acid partially depolymerized as defined in claim 1, said solution being substantially free of hyaluronidase.

4. A solution as defined in claim 3 containing an effective amount of an injectable therapeutic agent.

5. A solution as defined in claim 3 containing an effective amount of an injectable diagnostic agent.

6. A solution as defined in claim 3 containing an effective amount of an injectable X-ray contrast agent.

7. A solution as defined in claim 3 containing an effective amount of an injectable anesthetic agent.

8. The method of facilitating the spread and absorption of a parenterally administered drug which comprises admixing with the drug a physiological salt solution of an effective amount of hyaluronic acid partially depolymerized to the degree defined in claim 1 in the form of a non-toxic alkali metal salt and injecting the mixture.

9. The method of clearing lipemia in a living organism which comprises determining the presence of lipemia by observing the light transmission of the blood serum of the organism, administering hyaluronic acid partially depolymerized to the degree defined in claim 1 in an amount in the range 10–50 mg./kg. when the presence of lipemia is indicated, and determining the effect of the dosage after administration by a further observation of the light transmission of the blood serum.

References Cited in the file of this patent

Meyer: Advances in Enzymology, vol. 13, 1952, pp. 201, 202, 205, 206 and 209.

Reppert: Proc. Soc. Exptl. Biol. and Med., vol. 77, No. 2, June 1951, pp. 318–320.

Thompson: McGull Med. J., vol. 13, No. 1, 1944, pp. 51–59.

Rapport: J. Biol. Chem., vol. 192, 1951, pp. 283–291.

Hadidian et al.: Biochem. J., vol. 42, 1948, pp. 266–274.

Daubenmerkl: Chem. Abst., vol. 45, 1951, p. 8572(e).

UNITED STATES PATENT OFFICE
CERTIFICATE OF CORRECTION

Patent No. 2,850,428                                                  September 2, 1958

Joseph Seifter et al.

It is hereby certified that error appears in the printed specification of the above numbered patent requiring correction and that the said Letters Patent should read as corrected below.

Column 1, line 17, before "therapeutic" strike out "the"; line 61, for "certifuging" read -- centrifuging --; line 63, for "effects" read -- effect --; column 2, line 66, for "of", second occurrence, read -- and --; column 3, line 10, for "is" read -- it --; column 6, line 4, after "ADMINISTRA" insert a hyphen; line 14, after "ratio" strike out "of"; line 47, for "hyaluronidase-reactivating" read -- hyaluronidase-deactivating --; column 8, line 3, under "References Cited" for "McGull" read -- McGill --.

Signed and sealed this 18th day of November 1958.

(SEAL)

Attest:

KARL H. AXLINE
Attesting Officer

ROBERT C. WATSON
                                                                                       Commissioner of Patents